United States Patent [19]
Vitello et al.

[11] Patent Number: 4,951,940
[45] Date of Patent: Aug. 28, 1990

[54] WATER WEIGHT

[75] Inventors: Frank T. Vitello, Medford; Alfred J. Gailardi, Arlington, both of Mass.

[73] Assignee: Medical Equipment & Devices, Inc., Weymouth, Mass.

[21] Appl. No.: 317,851

[22] Filed: Mar. 2, 1989

Related U.S. Application Data

[63] Continuation of Ser. No. 117,027, Nov. 4, 1987, abandoned.

[51] Int. Cl.⁵ .............................................. A63B 21/065
[52] U.S. Cl. .................................... 272/119; 224/148
[58] Field of Search ............... 272/119, 122, 123, 128, 272/116, 117, 143, 67, 68, 96, 71; 128/402, 403; 224/148

[56]         References Cited
        U.S. PATENT DOCUMENTS

| | | | |
|---|---|---|---|
| 2,589,577 | 3/1952 | Rosenthal et al. | 128/403 X |
| 2,602,302 | 7/1952 | Poux | 128/402 X |
| 2,918,282 | 12/1959 | Waterval | 272/117 |
| 3,279,102 | 10/1966 | Seeber, Sr. . | |
| 3,406,968 | 10/1968 | Mason . | |
| 3,427,020 | 2/1969 | Montour et al. | 272/119 |
| 3,532,339 | 10/1970 | Smith | 272/119 |
| 3,548,819 | 12/1970 | Davis et al. | 128/402 X |
| 3,924,851 | 12/1975 | Winston | 272/119 |
| 4,139,130 | 2/1979 | Glusker et al. | 224/148 |
| 4,322,072 | 3/1982 | White | 272/119 |
| 4,344,620 | 8/1982 | Debski | 272/119 |
| 4,357,009 | 11/1982 | Baker . | |
| 4,384,369 | 5/1983 | Prince . | |
| 4,602,387 | 7/1986 | Zakrzewski | 272/119 |
| 4,700,943 | 10/1987 | Widinski et al. | 272/119 X |

Primary Examiner—Robert W. Bahr
Attorney, Agent, or Firm—Fish & Richardson

[57]         ABSTRACT

A hydro-inflatable, band-form weight device for aiding in the exercise of a limb, including a flexible, elongated, water-tight envelope adapted to contain a substantial weight of water and constructed to wrap circumferentially around a portion of the limb; a longitudinally-extending fastening strap joined to the elongated envelope, adapted to wrap circumferentially about the limb to overlap a portion of the band device, and fasteners associated with the overlapping portions, the strap and fasteners being adapted to secure the inflated band on the limb in a manner that preserves the wrapped condition and prevent migration of the band device along the limb during exercise.

7 Claims, 3 Drawing Sheets

WATER WEIGHT

This is a continuation of co-pending application Ser. No. 117,027 filed on Nov. 4, 1987, now abandoned.

BACKGROUND OF THE INVENTION

Weighted devices adapted to be secured about various portions of the body are known.

Mason 3,406,968 shows an exercise boot to be secured to the foot which is adapted to contain a filler of granular weight material evenly distributed within stitched channels.

Baker 4,357,009 discloses a water filled bag having portions that are secured to the lower leg and the foot simultaneously.

Prince 4,384,369 teaches an exercise suit adapted to apply weight in the form of water filled sacks to all parts of the body except the head, hands and feet.

SUMMARY OF THE INVENTION

The invention, a hydro inflatable, band-form weight device for aiding in the exercise of a limb, is easy to apply and remove, is versatile, specific and precise in its region of application, and is simple and inexpensive to manufacture.

According to one aspect, the invention comprises a flexible, elongated, water-tight envelope adapted to contain a substantial weight of water and constructed to wrap circumferentially around a portion of the limb; a longitudinally extending fastening strap joined to the elongated envelope, adapted to wrap circumferentially about the limb to over lap a portion of the band device; and fastening means associated with the overlapping portions, the strap and fastening means being adapted to secure the inflated band device on the limb in a manner that preserves the wrapped condition and prevents migration of the band device along the limb during exercise. In one preferred embodiment, the fastening means comprises cooperable hook and loop fastener portions. The longitudinally-extending fastening strap is an integral extension of at least one layer that defines a part of the water tight envelope. Preferably, the strap is defined by integral extensions of opposed layers that define the envelope, and in the region of the strap, the layers are joined together. The layers are comprised of heat-sealable plastic film. The layers in the region of the root of the strap defining extension are heat sealed together along a substantially transverse line to form part of the envelope, and about the periphery of the strap. The broad opposed envelope defining layers are composed of heat-sealable plastic film and are heat sealed together along corresponding peripheral edges. The layers are also secured together at a series of spaced apart, heat sealed, elongated narrow joints, each extending in the direction of the width of the envelope, and over a substantial portion of the width, to define a series of chambers in fluid communication with each other. The strap is adapted to overlap the envelope, and a respective portion of the fastening means is secured to the outer surface of the envelope. Preferably, an elongated loop fastener portion is secured to the strap and a hook fastener portion is secured to the outer face of the water filled envelope, the loop fastener portion and the hook fastener portion preferably being heat sealed to respective faces of the device. The elongated envelope has a fill port at one end and printed indicia along the length of the envelope which denote a graded series of fill weights. The fastening means extends circumferentially along the device over a distance sufficient to adjustably secure the free end of the strap over the range of fill weights. A preferred embodiment of the invention will now be described in detail with reference to the accompanying drawings, where:

Figure 6A:
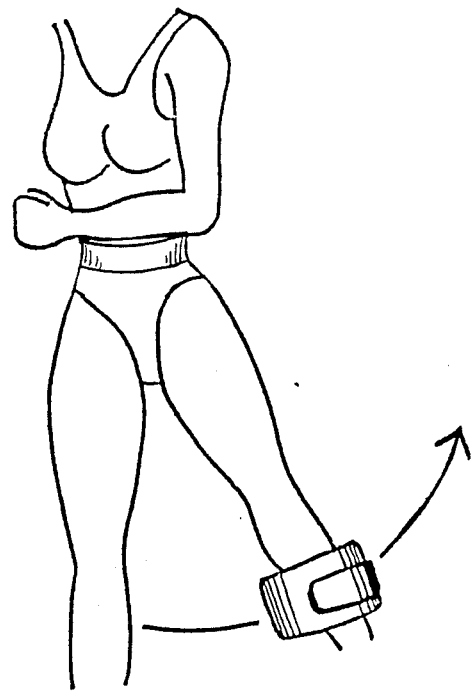
Figure 6B:
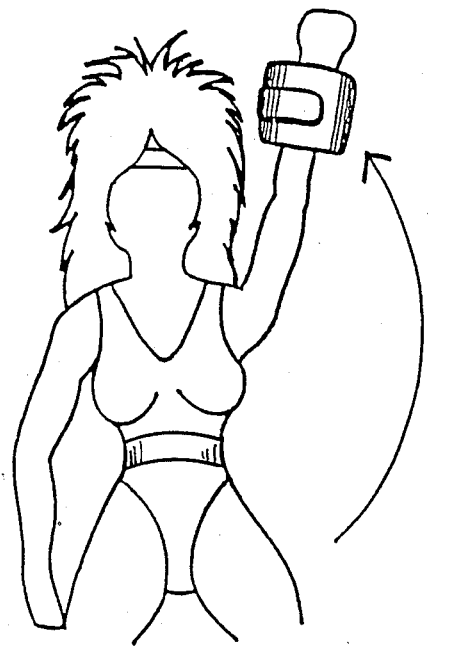
Figure 6C:

FIG. 6a, 6b, and 6c illustrate various modes of use.

Figure 1:
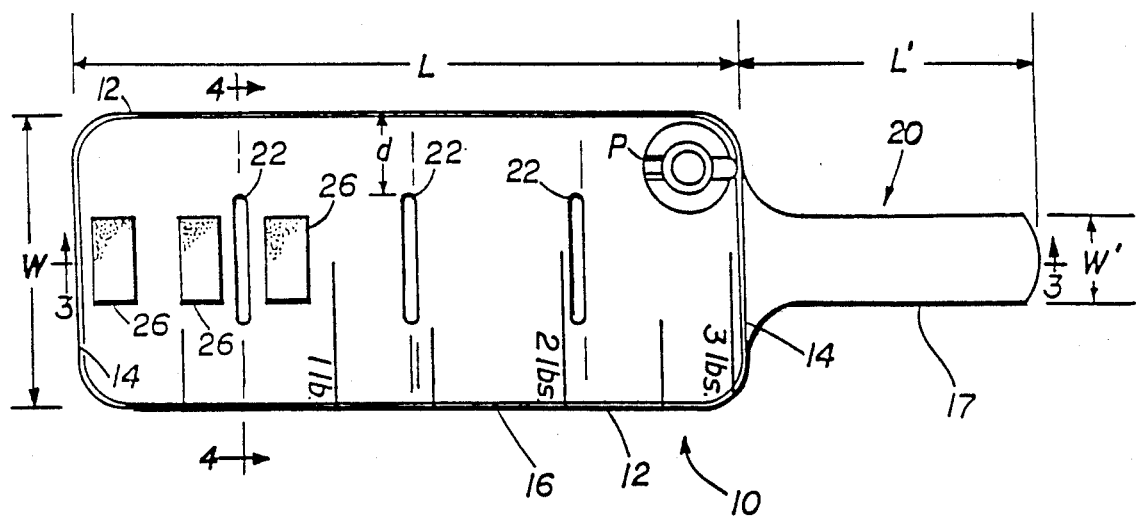
FIG. 1 is a top plan view of the hydro inflatable band form weight device.

Referring to the drawings, the hydro-inflatable band form device as shown in FIG. 1 comprises an envelope 10 of elongated rectangular form adapted to contain, in an evenly distributed manner, selected quantities of water. The envelope has spaced, parallel long sides 12 of length L, 15 ¼ in., and spaced, parallel short sides 14 of width W, 6 ⅛ in., and is comprised of two plies 15 of flexible water impermeable vinyl plastic, which are coextensive in area and are joined to each other at their long and short sides by heat sealing to provide a welded seam 16 extending peripherally about the envelope. At one end of the envelope, there is an integral strap extension 20 of length L', 7 in., which is shorter than the length of the envelope, and width W', 2 in. which is narrower than the width w of the envelope. This extension is comprised of extended overlying portions of the two plies, also heat sealed at their periphery to form welded seam 17.

Within the region bounded by the sides and ends, there are three heat sealed narrow, long areas 22 which are parallel to the ends 14. These are spaced at generally equal distances from the opposite ends of the device and terminate at a distance d, 1 ¾ in., from the opposite sides. These sealed areas, provided by heat sealing the plies to each other, divide the interior of the container into four compartments 24 of substantially equal size which are in communication with each other at both ends of the sealed areas. The sealed areas constitute hinges between compartments which facilitate wrapping the envelope about the limb to which it is applied, and, as described below, aid in stabilizing the distribution of the water.

A fill port element P is joined to the top ply 15, adjacent to the strap end of the device, through which fluid can be introduced into the container in an amount selected in accordance with the degree of exercise desired. This ply is transparent, and there are printed indicia provided along the length of the envelope on this top ply to allow the amount of water introduced to be measured in terms of the weight added to the device.

The dimensions of the envelope are selected so that the envelope can be wrapped about the limb to be exercised. The long side 12 is of such length that the device can substantially cover the entire circumference of the limb while the short side 14 is selected to give the device a band form.

For securing the envelope about the limb, attaching means are provided in the form of a spaced series of patches of hook fastener material and a strip of loop fastener material*, 26 and 28 respectively. As shown in FIG. 1, the patches of hook fastener material 26, are each substantially rectangular in configuration 1 in. in the direction of the length of the envelope and 2 in.

transversely, spaced 1 in. from each other, and applied to one face of the envelope near one end, within the periphery of the envelope and on its longitudinal center line. * available under the trademark VELCRO ® from VELCRO USA, INC.

Figure 2:
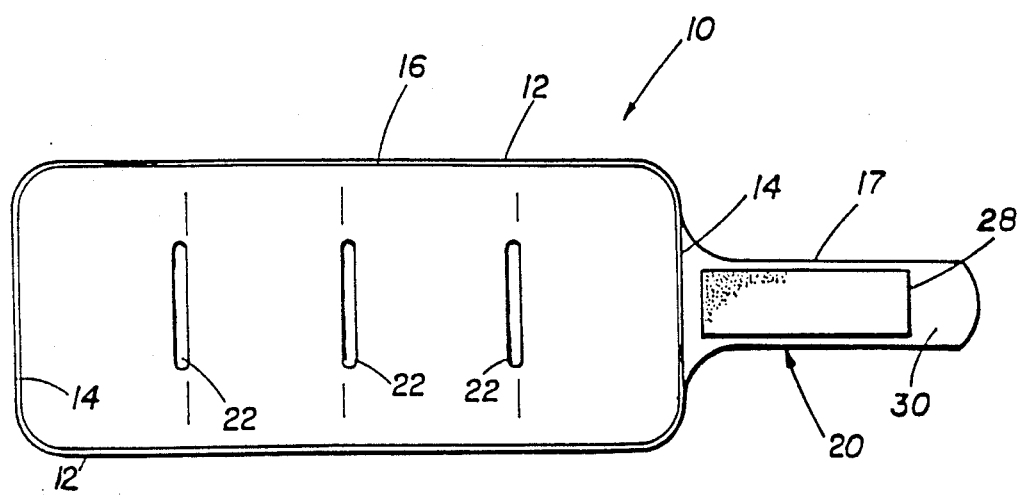
FIG. 2 is a bottom plan view of the device.
Figure 3:
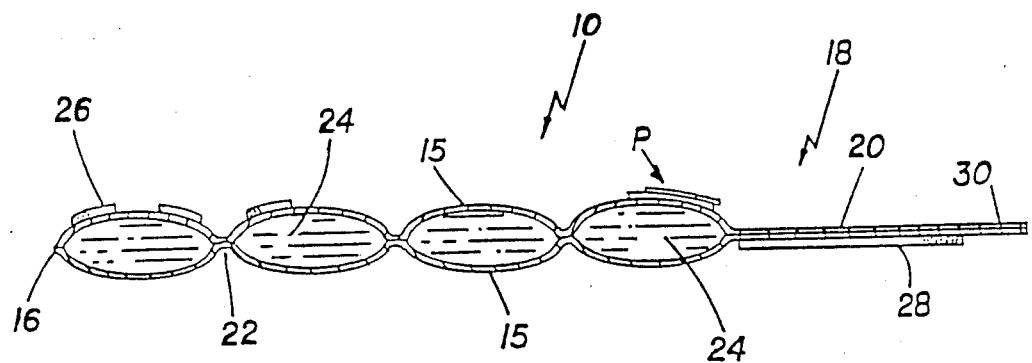
FIG. 3 is a longitudinal section taken on line 3—3 of FIG. 1.
Figure 4:
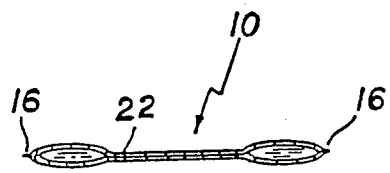
FIG. 4 is a transverse section taken on line 4—4 of FIG. 1.
Figure 5:
FIG. 5 depicts the device in a wrapped condition about a wrist.

As in FIG. 2, the strip of loop fastener material 28 is applied to the opposite side of the envelope at the opposite end, is of substantially rectangular configuration, 5 ⅜ in. long 1 ¾ in. wide and extends longitudinally along the integral strap extension 20, terminating short of the end thereof so that a portion of the extension 30 remains uncovered and provides a tab to facilitate grasping the integral extension to wrap the envelope about the limb and to engage the hook and loop fastener material at the opposite end of the envelope.

The envelope may be made of any suitable flexible, tough and resilient plastic, e.g., Dynamit-Nobel Vinyl.

USE OF THE HYDRO INFLATED BAND DEVICE

The device is useful as part of a safe and effective exercise program, simply using water from a readily available tap. It is especially convenient for use by travelers, who can pack and transport it in the unfilled state. It may be applied to various portions of an arm or a leg. By simply varying the amount of water in the device, one can gradually increase the
*available under the trademark VELCRO® from VELCRO USA, INC. weight lifted. This helps the exerciser to avoid causing injury by exceeding the tolerance level, while still providing sufficient challenge.

For example, initially, a small amount of weight is lifted for ten repetitions. If this is comfortable, two more sets of ten repetitions may be attempted. Once three sets of repetitions can be completed with ease, one adds from one half to one additional pound of water to the device.

The appropriate amount of water is poured into the device, as measured by reference to the indicia provided along the length of the envelope. Residual air trapped within the envelope is minimized by holding the device by it's fastening strap. The weight of the water applies tension to the walls of the envelope in the unfilled region, drawing the walls together and substantially excluding air. After the correct amount of water has been added, the port is sealed. Then, the device is wrapped around the target limb. This is best accomplished by pressing the wide end firmly and fixedly against the limb and simultaneously wrapping the device so that a maximum of tension is maintained while the strap is pulled tight, as the hook and loop fastener portions meet to secure the band in place. The three narrow heat sealed areas allow the device to uniformly and regularly mold to the shape of the limb, and by partitioning the volume of water into smaller portions, evenly distribute the weight, reduce sloshing, and add to the stability of the band device on the limb; all in a device that requires filling at only one point.

There are exercises that emphasize the shoulder, the elbow, the wrist, the hip, the knee, and the ankle. In all cases, the exercises preferably follow the same cycle:
1. Lift the weight slowly through the movement.
2. Hold the muscle contraction for five (5) seconds.
3. Lower the weight slowly.
4. Relax the muscle.
5. Repeat.

Stretching before and after exercise will help prevent the muscles from tightening after a strenuous workout.

It should be understood that the present disclosure is for the purpose of illustration only and includes all modifications or improvements which fall within the scope of the appended claims.

We claim:

1. A band-form weight device adapted to be worn on and for the exercise of a limb of a body comprising:

an elongated, flat liquid-tight envelope defined, in an unfilled condition, by juxtaposed flat layers of plastic material heat sealed together along corresponding peripheral edges and further heat sealed together at a series of spaced apart, hinge joints each extending in the direction of the width of the envelope defining a series of at least three chambers which are substantially flat when unfilled, in fluid communication with each other, said layers being of the same size and constructed so as to be flat and closely spaced when empty and to separate during filling only to the extent necessary to receive liquid during filling so as to cause limited introduction of air during filling, said hinge joints facilitating filling of liquid with limited introduction of air, said envelope having a pill port for introduction and removal of liquid that is located near a longitudinal end of said envelope so as to facilitate filling with limited introduction of air; weighting liquid substantially evenly distributed among said chambers thereby providing a filled region of said envelope, the layers in the remaining, unfilled region of said envelope being proximate to each other an amount sufficient to exclude all but a minimum quantity of air in said unfilled region; a strap longitudinally joined to and extending from one of said envelope which, when said envelope contains weighting fluid and is wrapped about a limb, wraps about said envelope, is fastened thereto and, as fastened, exerts pressure on said envelope and the weighting liquid therein whereby to substantially evenly distribute said weighting liquid in said envelope; and fastening means on a side of said envelope and on a complementary facing side of said strap; said tensioned, limb-molded envelope having a minimum of air in the space in said envelope not filled with weighting liquid sufficient to minimize sloshing of said weighting liquid.

2. A liquid-inflatable, band-form weight device for exercise of a limb of a body, comprising:

an elongated, liquid-tight envelope, said envelope comprising, in an unfilled state, juxtaposed top and bottom layers, each of generally flat, flexible, substantially non-extendable material joined peripherally, in flat water-tight manner to define a closed, expansible volume, said layers being of the same size and constructed so as to be flat and closely spaced when empty and to separate during filling only to the extent necessary to receive liquid during filling so as to cause limited introduction of air during filling, said top layer and said bottom layer further joined face to face to each other in regions extending along generally transverse hinge lines dividing said volume into at least three expansible chambers, with inter-communicating channels for distributive movement of liquid between adjacent expansible chambers, said hinge lines facilitating filling of liquid with limited introduction of air, said envelope thus defined having a range of permissible, selectable fill volumes up to a fully expanded condition, said envelope being of a length and constructed to be wrapped circumferentially about said limb;

a pill port for introduction of liquid into and removal of liquid from said expansible volume of said envelope, said pill port being located near a longitudinal end of said envelope so as to facilitate filling with limited introduction of air;

a longitudinally extending strap joined to and extending longitudinally from said envelope as an effective, tension-applying extension of at least one of said layers, said strap being of a size and construction to over-wrap said envelope a distance sufficient to adjustable secure such strap under tension to said envelope over a range of selected liquid fill volumes; and fastening means on opposed surfaces of said strap and said envelope for secure attachment of said strap under tension to the over-wrapped portion of said envelope in a manner to secure said band-form device about said limb during aggressive exercise, said envelope, strap and fastening means being cooperatively constructed and arranged such that wrapping said envelope about said limb and over-wrapping and fastening said strap under tension to said envelope to secure the envelope to the limb, simultaneously applies band-tension to said top layer that can apply pressure to any liquid confined in said expansible chambers, to cause the liquid to substantially evenly distribute itself among said chambers while molding the shape of said envelope to the shape of said limb, the top and bottom layer defining said wrapped, tensioned envelope being adapted to be spaced apart substantially only to the extent that weighting liquid is interposed therebetween.

3. The device of claim 2 wherein said longitudinally extending fastening strap is an integral extension of at least one layer that defines a part of said water-tight envelope.

4. The device of claim 3 wherein said strap is defined by integral extensions of opposed top and bottom layers that define said envelope in the region of said strap where said layers are joined together.

5. The device of claim 2 wherein said opposed layers, comprising heat-sealable plastic film, are heat-sealed together along corresponding peripheral edges to form said envelope, and are heat-sealed together in said regions of said hinge lines.

6. The band-form device of claim 2 where at least one of said top and bottom layers of said elongated envelope carries a set of level indicia distributed from said pill port to the opposite end of the band-form device, whereby, by holding the elongated device vertically with said pill port up, and introducing liquid, the liquid fills the series of expansible chambers in sequence via said intercommunicating channels, to a selected level corresponding to a desired exercise weight, and thereafter upon sealing said pill port and securing said band device about said limb under tension exerted by said strap, said liquid weight is automatically distributed about said limb.

7. The band-form device of claim 2 partially filled with a selected volume of weighting liquid.

* * * * *

UNITED STATES PATENT AND TRADEMARK OFFICE
CERTIFICATE OF CORRECTION

PATENT NO. : 4,951,940

DATED : August 28, 1990

INVENTOR(S) : Frank T. Vitello et al.

It is certified that error appears in the above-identified patent and that said Letters Patent is hereby corrected as shown below:

ON TITLE PAGE: Item [75]
Change second inventor's name from Alfred J. Gailardi to
--Alfred J. Ghilardi--;

Col. 2, line 23, change "6 1/8" to --6 3/4--;
Col. 3, line 29, "weightlifted ... challenge" should be in bigger letters and begin at line 27 after "the";
Col. 4, claim 1, line 21, "pill" should be --fill--;
Col. 5, claim 2, line 3, "pill" should be --fill--;
Col. 5, claim 2, line 5, "pill" should be --fill--;
Col. 5, claim 2, line 13, "adjustable" should be --adjustably--;
Col. 6, claim 6, line 19, "pill" should be --fill--;
Col. 6, claim 6, line 22, "pill" should be --fill--;
Col. 6, claim 6, line 26, "pill" should be --fill--;
Col. 6, claim 7, line 30, "of" should be --claimed in--.

Signed and Sealed this

Twelfth Day of May, 1992

Attest:

DOUGLAS B. COMER

*Attesting Officer*     *Acting Commissioner of Patents and Trademarks*